United States Patent
Kim

(10) Patent No.: US 11,076,266 B2
(45) Date of Patent: Jul. 27, 2021

(54) APPARATUS AND METHOD OF PERFORMING POSITIONING IN NEW RADIO

(71) Applicant: KT CORPORATION, Gyeonggi-do (KR)

(72) Inventor: Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/745,698

(22) Filed: Jan. 17, 2020

(65) Prior Publication Data

US 2020/0236506 A1    Jul. 23, 2020

(30) Foreign Application Priority Data

Jan. 18, 2019 (KR) .......... 10-2019-0007084
Dec. 19, 2019 (KR) .......... 10-2019-0170584

(51) Int. Cl.
*H04L 5/00* (2006.01)
*H04L 27/26* (2006.01)
*H04W 4/029* (2018.01)
*H04W 72/04* (2009.01)

(52) U.S. Cl.
CPC .......... *H04W 4/029* (2018.02); *H04L 5/0048* (2013.01); *H04W 72/04* (2013.01)

(58) Field of Classification Search
CPC ....... H04W 4/029; H04W 72/04; H04W 4/80; H04W 4/70; H04W 4/02; H04W 64/00; H04W 72/0446; H04W 72/0453; H04L 5/0048; H04L 27/26025; H04L 27/261; H04L 5/0023; H04L 5/001; H04L 5/0091; H04L 5/0082; H04L 27/2602
See application file for complete search history.

(56) References Cited

U.S. PATENT DOCUMENTS

2011/0117926 A1* 5/2011 Hwang ................ H04W 64/00
                                                    455/456.1
2020/0107286 A1* 4/2020 Akkarakaran ........ G01S 5/0236

* cited by examiner

*Primary Examiner* — Joseph E Dean, Jr.
(74) *Attorney, Agent, or Firm* — IP Legal Services, LLC

(57) ABSTRACT

Provided are methods and apparatuses for performing positioning. The method may include receiving SPS configuration information for transmission of a UL PRS from a base station, and transmitting the UL PRS based on the SPS configuration information.

6 Claims, 21 Drawing Sheets

*FIG.18*

The IE PRS-Info provides the information related to the configuration of PRS in a cell

```
-- ASN1START
PRS-Info ::= SEQUENCE {
    prs-Bandwidth          ENUMERATED { n6, n15, n25, n50, n75, n100, ...}
    prs-ConfigurationIndex INTEGER (0..4095),
    unmUL-Frames           ENUMERATED {sf-1, sf-2, sf-4, sf-6, ..., sf-add-v1420},
    ...,
    prs-MutingInfo-r9      CHOICE {
    ulprs-BWPIndex         INTEGER (0..3)

-- ASN1STOP
```

APPARATUS AND METHOD OF PERFORMING POSITIONING IN NEW RADIO

CROSS-REFERENCE TO RELATED APPLICATION

This application claims the priority benefit of Korean Patent Application Nos. 10-2019-0007084 and 10-2019-0170584, filed on Jan. 18, 2019 and Dec. 19, 2019 in the Korean Intellectual Property Office, the disclosures of which are incorporated herein by reference in their entirety.

BACKGROUND

1. Technical Field

The present disclosure relates to methods and apparatuses for measuring a position of a user device or terminal (hereinafter, referred to as a user equipment or "UE")

2. Description of the Related Art

Recently, the 3rd generation partnership project (3GPP) has approved the "Study on New Radio Access Technology", which is a study item for research on next-generation/ 5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

In particular, it is required to design an uplink positioning reference signal (UL PRS) for supporting various use cases and high resolution associated with position measurement of a UE required in the NR.

SUMMARY

In accordance with embodiments of the present disclosure, methods and apparatuses are provided for transmitting a UL PRS by semi-persistent scheduling (SPS) for measuring a position of a UE.

In accordance with one aspect of the present disclosure, a method of a UE is provided for performing positioning. The method may include: receiving SPS configuration information for transmission of a UL PRS from a base station, and transmitting the UL PRS based on the SPS configuration information.

In accordance with another aspect of the present disclosure, a method of a base station is provided for performing positioning. The method may include: transmitting SPS configuration information for transmission of a UL PRS to a UE, and receiving the UL PRS based on the SPS configuration information.

In accordance with further another aspect of the present disclosure, a UE is provided for performing positioning. The UE may include: a receiver receiving SPS configuration information for transmission of a UL PRS from a base station, and a transmitter transmitting the UL PRS based on the SPS configuration information.

In accordance with yet another aspect of the present disclosure, a base station is provided for performing positioning. The base station may include: a transmitter transmitting SPS configuration information for transmission of a UL PRS to a UE, and a receiver receiving the UL PRS based on the SPS configuration information.

In accordance with embodiments of the present disclosure, it is possible to provide methods and apparatuses for transmitting a UL PRS by SPS for measuring a position of a UE.

BRIEF DESCRIPTION OF THE DRAWINGS

The above and other aspects, features, and advantages of the present disclosure will be more apparent from the following detailed description taken in conjunction with the accompanying drawings, in which:

FIG. 18 is a view illustrating a UL positioning reference signal information element according to at least one embodiment of the present disclosure;

DETAILED DESCRIPTION

Figure 1:
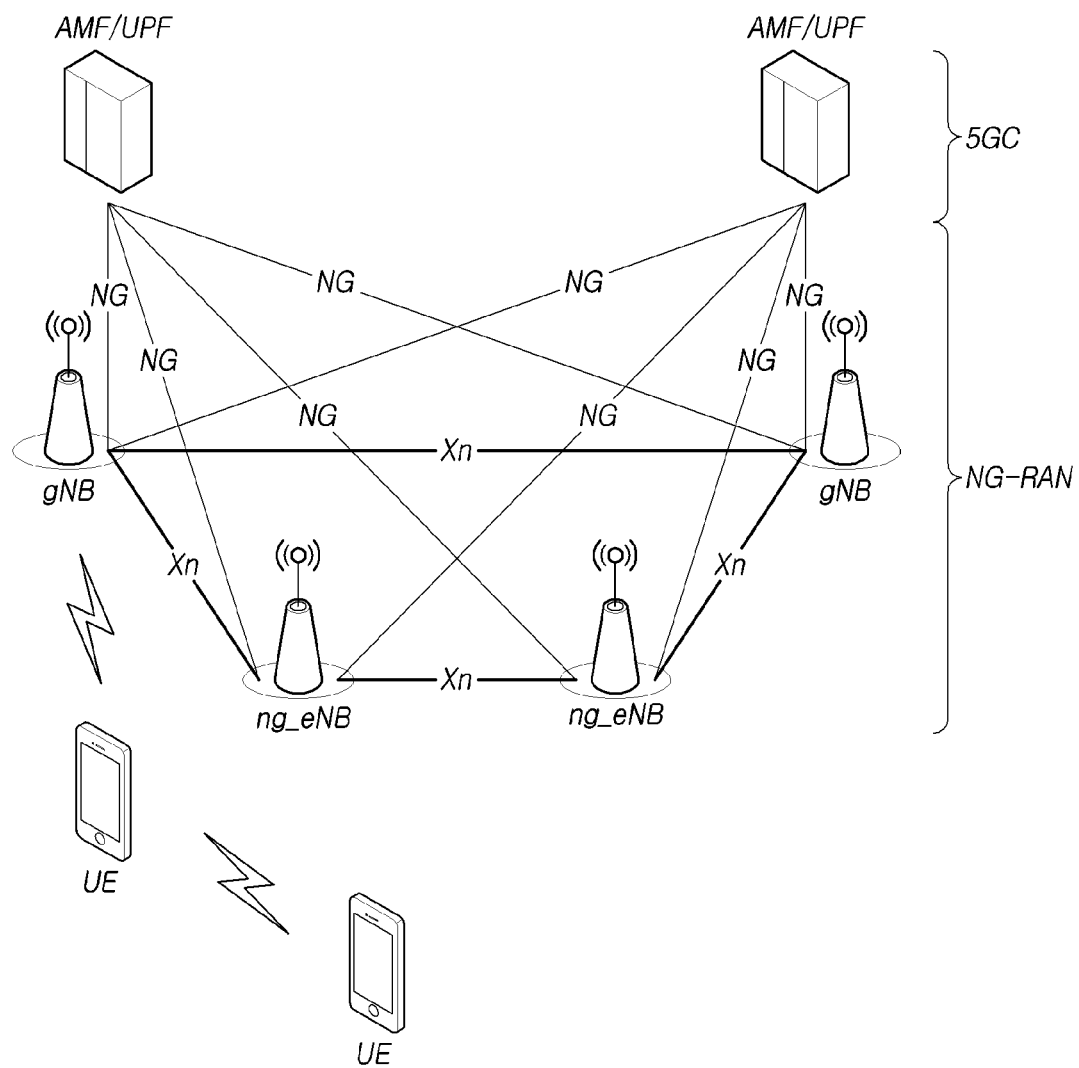
FIG. 1 is a view schematically illustrating an NR wireless communication system to which at least one embodiment is applicable.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1: FR1) and frequency bands equal to or greater than 6 GHz (frequency range 2: FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
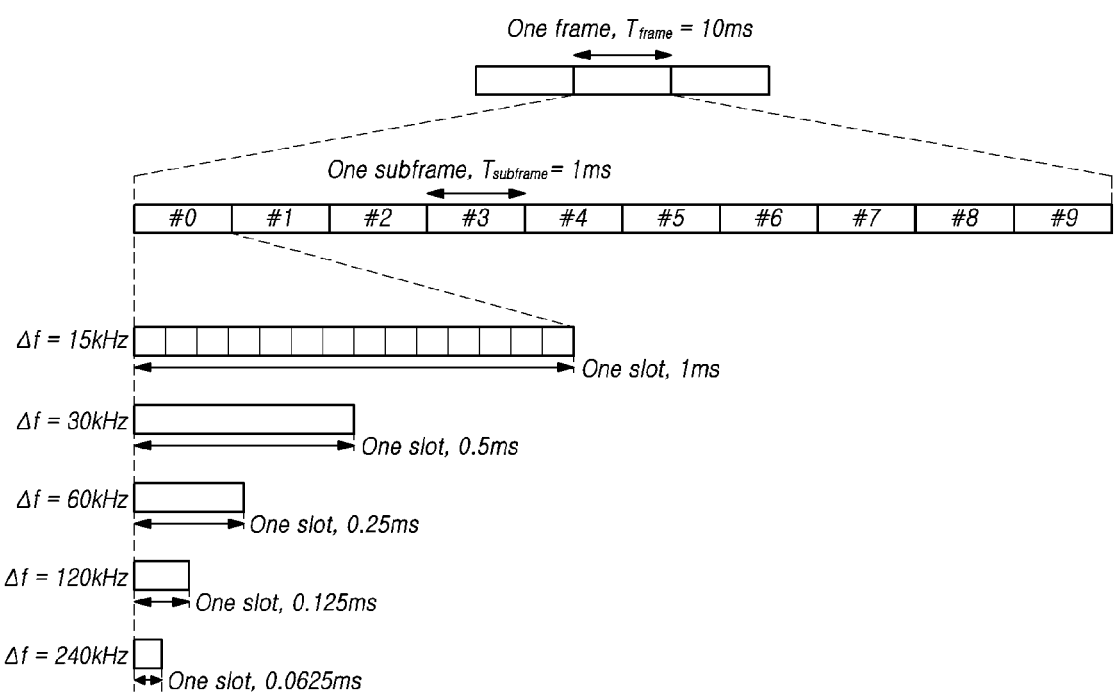
FIG. 2 is a view for explaining a frame structure in an NR system.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
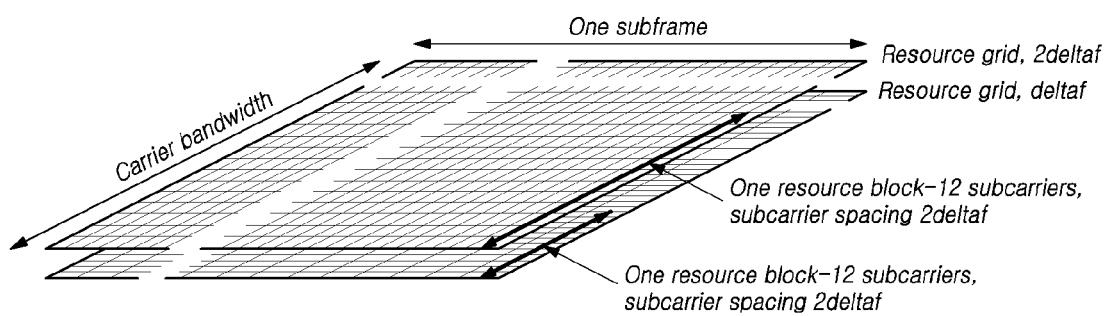
FIG. 3 is a view for explaining resource grids supported by a radio access technology.

FIG. 3 is a view for explaining resource grids supported by a radio access technology to which the present embodiment is applicable.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
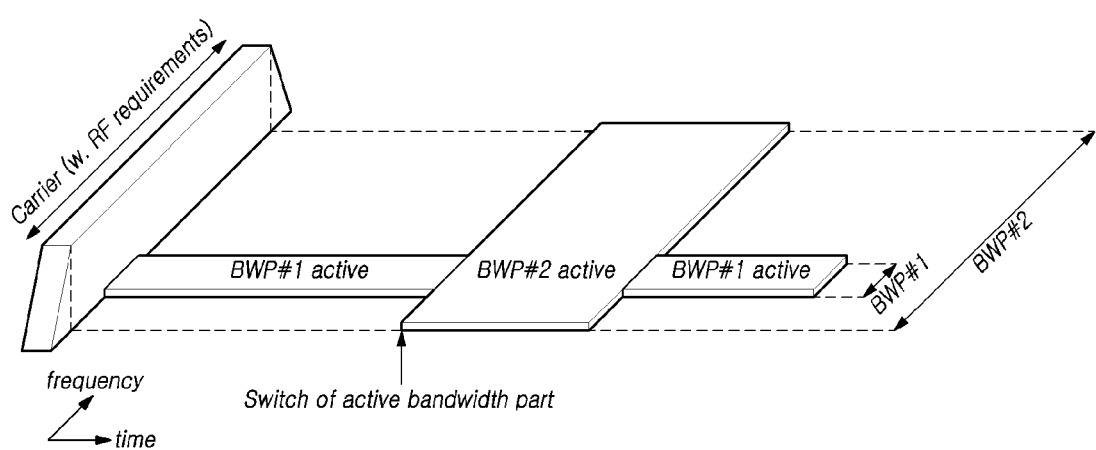
FIG. 4 is a view for explaining bandwidth parts supported by a radio access technology.

FIG. 4 is a view for explaining bandwidth parts supported by a radio access technology to which the present embodiment is applicable.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs so as to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
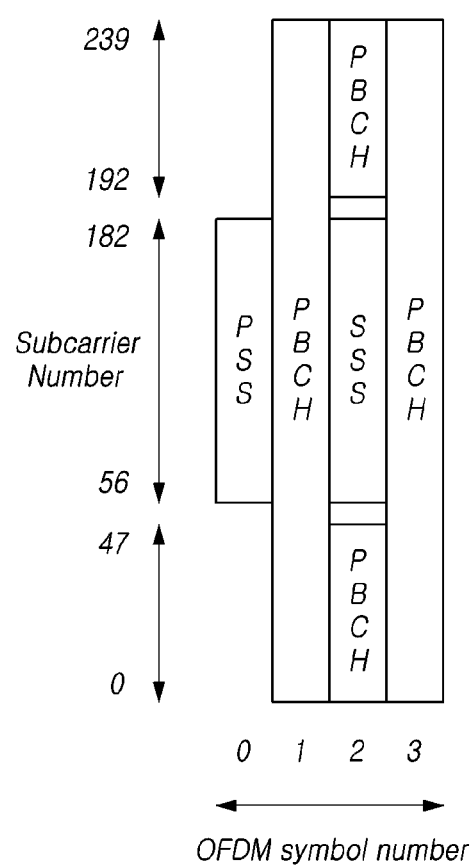
FIG. 5 is a view illustrating an example of a synchronization signal block in a radio access technology.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
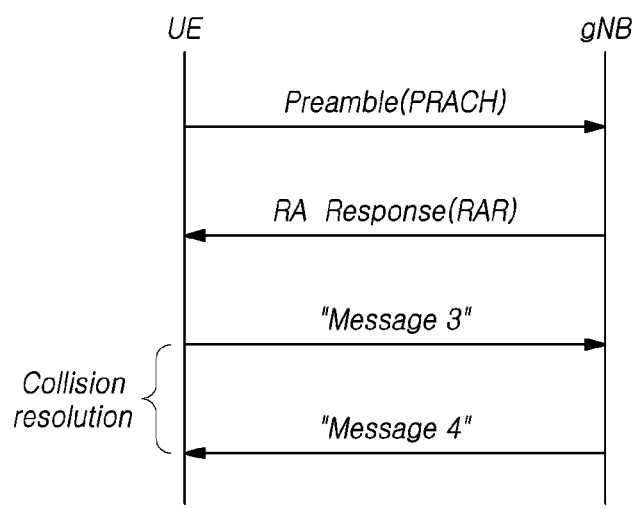
FIG. 6 is a view for explaining a random access procedure in a radio access technology.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
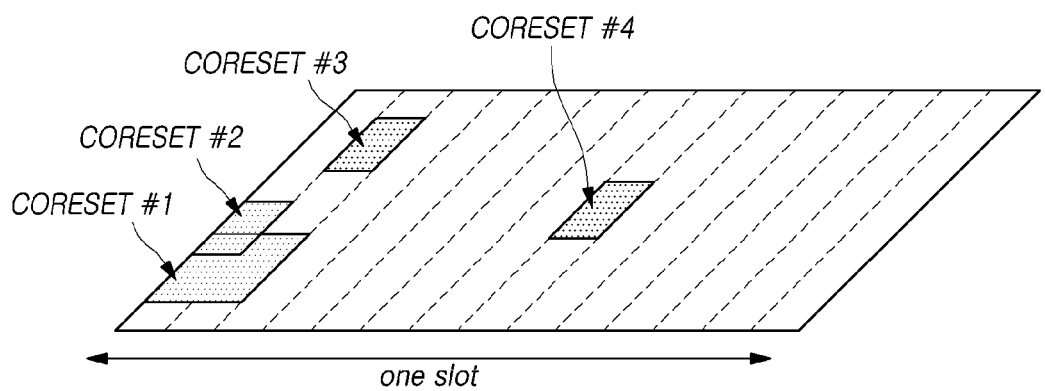
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Recently, the 3GPP has approved the "Study on New Radio Access Technology", which is a study item for research on next-generation/5G radio access technology. On the basis of the Study on New Radio Access Technology, in RAN WG1, discussions have been in progress on frame structures, channel coding and modulation, waveforms, multiple access schemes, and the like for the NR. It is required to design the NR not only to provide an improved data transmission rate, but also to meet various QoS requirements for each detailed and specific usage scenario, compared to the LTE/LTE-Advanced.

In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a subframe has been defined as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, it may be difficult to satisfy latency requirements. To this end, a mini-slot may be defined to be made up of fewer OFDM symbols than the slot. Thus the scheduling for the latency critical data, such as the URLLC, may be performed based on the mini-slot.

Figure 8:
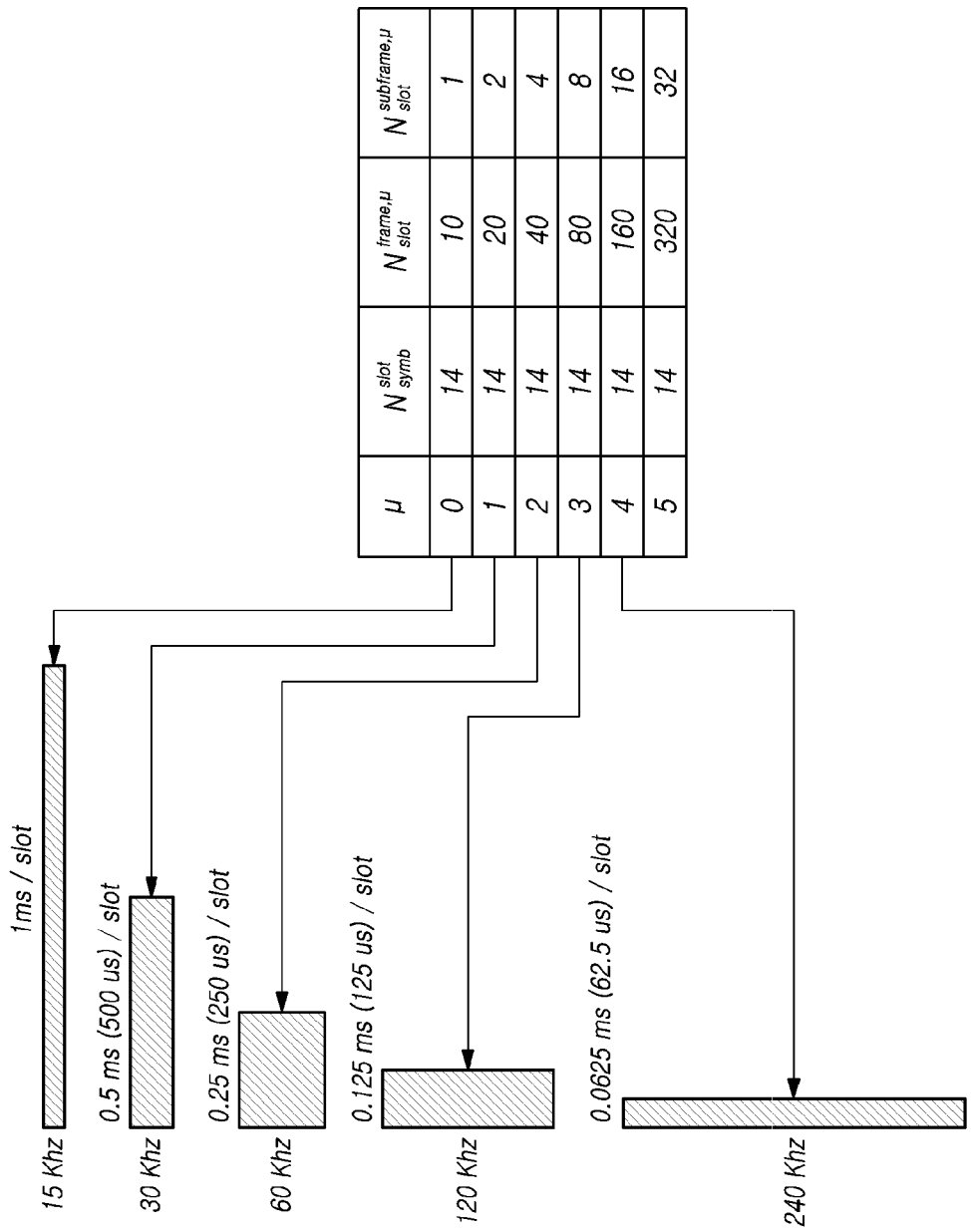
FIG. 8 is a view illustrating an example of symbol level alignment among different subcarrier spacings (SCSs)

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

Meanwhile, channel state information (CSI) provides a channel state for a network using a channel state indicator, instead of channel estimation using a typical cell-specific RE (reference signal) (CRS). It is cell-specific, but configured by RRC signaling of a UE. A definition of Channel State Information Reference Signal (CSI-RS) was introduced in LTE Release 10. The CSI-RS is used for allowing a UE to obtain channel state information by estimating demodulation reference signals.

Figure 9:
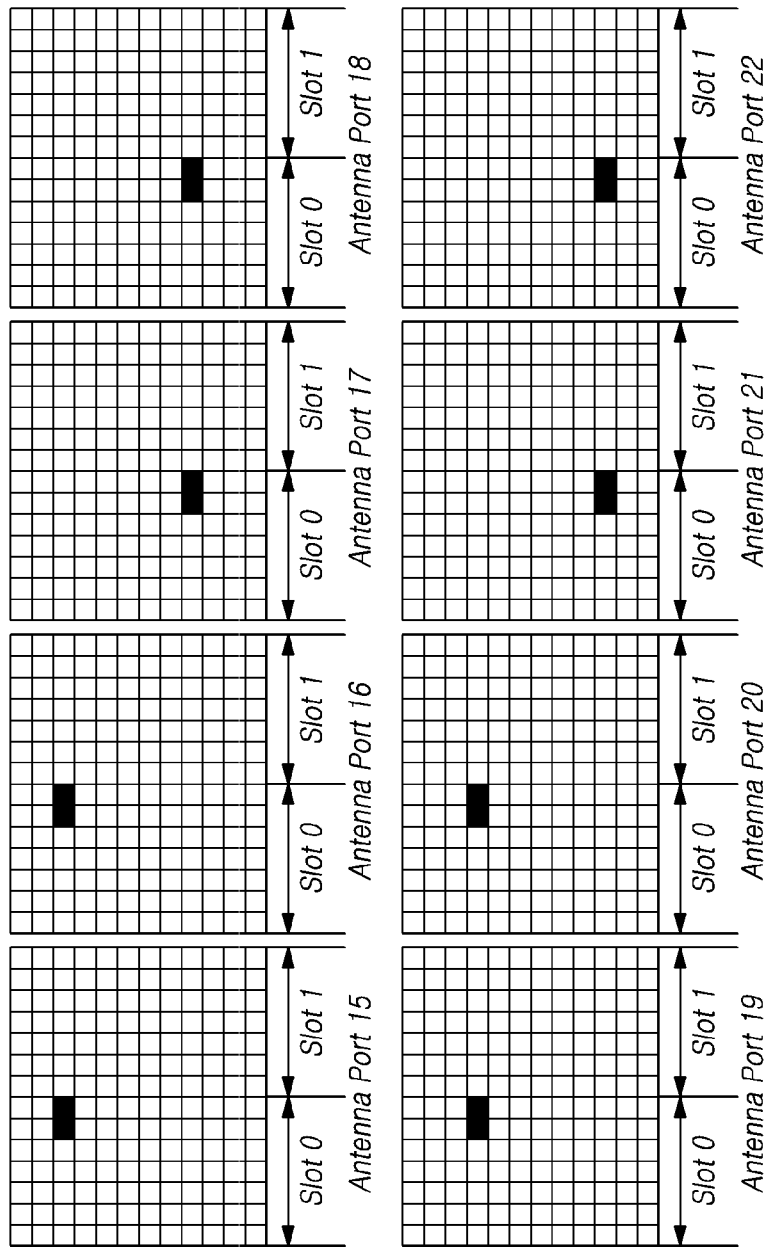
FIG. 9 is a view illustrating an LTE-A CSI-RS structure.

In LTE Rel-8/9, a cell is defined to support a maximum of 4 CRSs. As the LTE evolves from LTE Rel-8/9 to LTE-A (Rel-10), it has been necessary for the CSI to be extended for enabling a cell reference signal to support a maximum 8-layer transmission. Here, antenna ports of 15-22 are allocated as represented in FIG. 9, a transmission periodicity and mapping for resource allocation is determined through RRC configuration. Table 2 defines a mapping method through CSI-RS configuration for normal CP.

TABLE 2

Mapping from CSI reference signal configuration to (k', l') for normal cyclic

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
|  | 1 | (11, 2) | 1 | (11, 2) | 1 | (11, 2) | 1 |
|  | 2 | (9, 2) | 1 | (9, 2) | 1 | (9, 2) | 1 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 23 | (8, 1) | 1 | (8, 1) | 1 |  |  |
|  | 24 | (6, 1) | 1 | (6, 1) | 1 |  |  |
|  | 25 | (5, 1) | 1 |  |  |  |  |
|  | 26 | (4, 1) | 1 |  |  |  |  |
|  | 27 | (3, 1) | 1 |  |  |  |  |
|  | 28 | (2, 1) | 1 |  |  |  |  |
|  | 29 | (1, 1) | 1 |  |  |  |  |
|  | 30 | (0, 1) | 1 |  |  |  |  |

In the NR, the X-port CSI-RS has been finally defined as being allocated to N consecutive/non-consecutive OFDM symbols. Here, the X-ports are CSI-RS ports, where X is a maximum of 32. The CSI-RS is allocated over the N symbols, where N is a maximum of 4.

Figure 10:
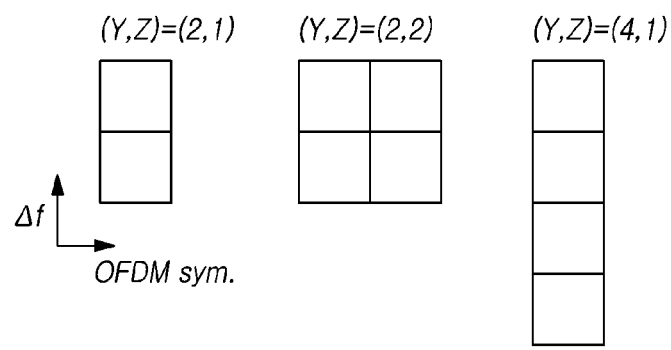
FIG. 10 is a view illustrating NR component CSI-RS RE patterns.

Basically, the CSI-RS has three component resource element (RE) patterns in total as illustrated in FIG. 10. Y and Z represent lengths on the time and frequency axes of CSI-RS RE patterns, respectively.

$(Y,Z) \in \{(2,1),(2,2),(4,1)\}$

Figure 11:
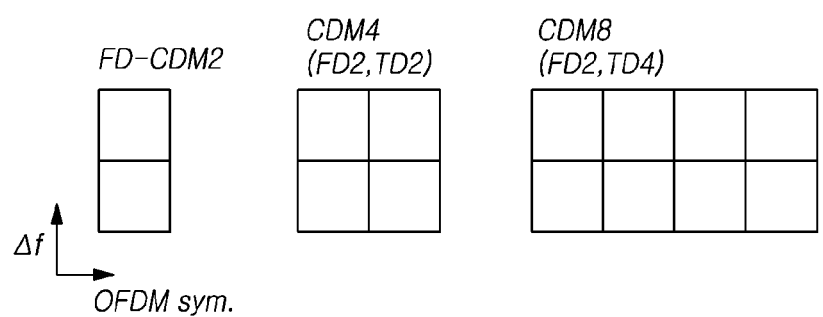
FIG. 11 is a view illustrating NR CDM patterns.

Further, three CDM patterns in total are supported in the NR as illustrated in FIG. 11.

FD-CDM2, CDM4(FD2,TD2), CDM8(FD2,TD4)

Here, following Tables 3 to 6 represent spreading sequences allocated to each CDM pattern in actual.

TABLE 3

The sequences $w_f(k^1)$ and $w_t(l^1)$ for CDMType equal to 'no CDM'

| Index | $w_f(k')$ | $w_t(l')$ |
|---|---|---|
| 0 | 1 | 1 |

TABLE 4

The sequences $w_f(k')$ and $w_t(l')$ for CDMType equal to 'FD-CDM2'

| Index | $w_f(k')$ | $w_t(l')$ |
|---|---|---|
| 0 | [+1 +1] | 1 |
| 1 | [−1 −1] | 1 |

TABLE 5

The sequences $w_f(k')$ and $w_t(l')$ for CDMType equal to 'CDM4'

| Index | $w_f(k')$ | $w_t(l')$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

TABLE 6

The sequences $w_f(k')$ and $w_t(l')$ for CDMType equal to 'CDM8'

| Index | $w_f(k')$ | $w_t(l')$ |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |

TABLE 6-continued

The sequences $w_t(k')$ and $w_t(l')$ for CDMType equal to 'CDM8'

| Index | $w_t(k')$ | $w_t(l')$ |
|---|---|---|
| 5 | [+1 −1] | [+1 +1 −1 −1] |
| 6 | [+1 +1] | [+1 −1 −1 +1] |
| 7 | [+1 −1] | [+1 −1 −1 +1] |

Figure 12:
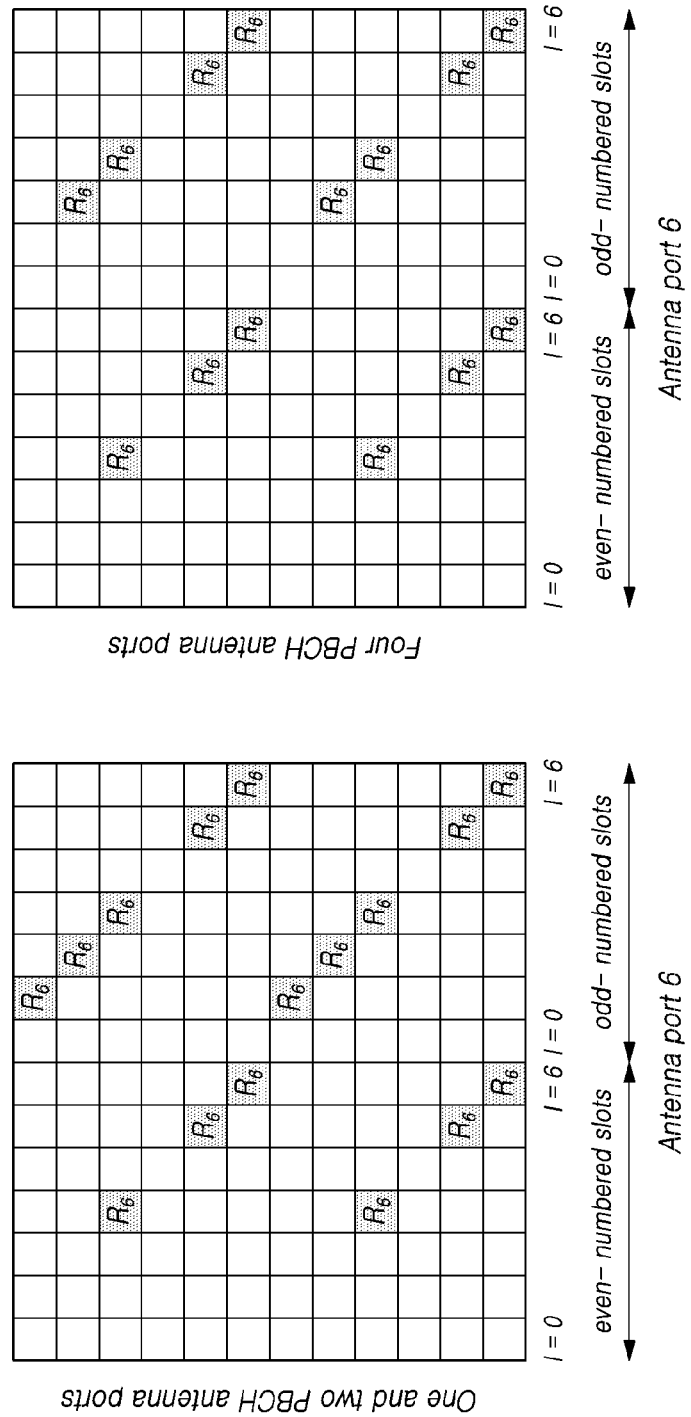
FIG. 12 is a view illustrating mapping of positioning reference signals in case of normal cyclic prefix.

In the LTE, higher-layer signaling may be transmitted via antenna port 6 as illustrated in FIG. 12. Through this, a UE performs position measurement. Basically, a PRS is transmitted to a pre-defined area through higher-layer signaling parameter configuration.

$\Delta_{PRS}$: subframe offset $T_{PRS}$: periodicity, 160, 320, 640, 1280 subframes $N_{PRS}$: duration (=No. of consecutive subframes), 1, 2, 4, 6 subframes Basically, the PRS uses a pseudo random sequence, that is, a quasi-orthogonal characteristic sequence. That is, PRS sequences that overlap over code may be separated using this orthogonal characteristic. In frequency domain, as shown in FIG. 12, a total of 6 cells including 5 neighboring cells may be orthogonally allocated using frequency reuse factor=6. Here, a physical cell ID ("PCI") is basically used as an offset value for a frequency domain position of a PRS RE.

Finally, since a collision occurs in case all target cells configure an identical PRS transmission interval in the time domain, PRS transmission may be performed at an orthogonal time interval between specific cells or cell groups by configuring a muting interval per cell.

Figure 13:
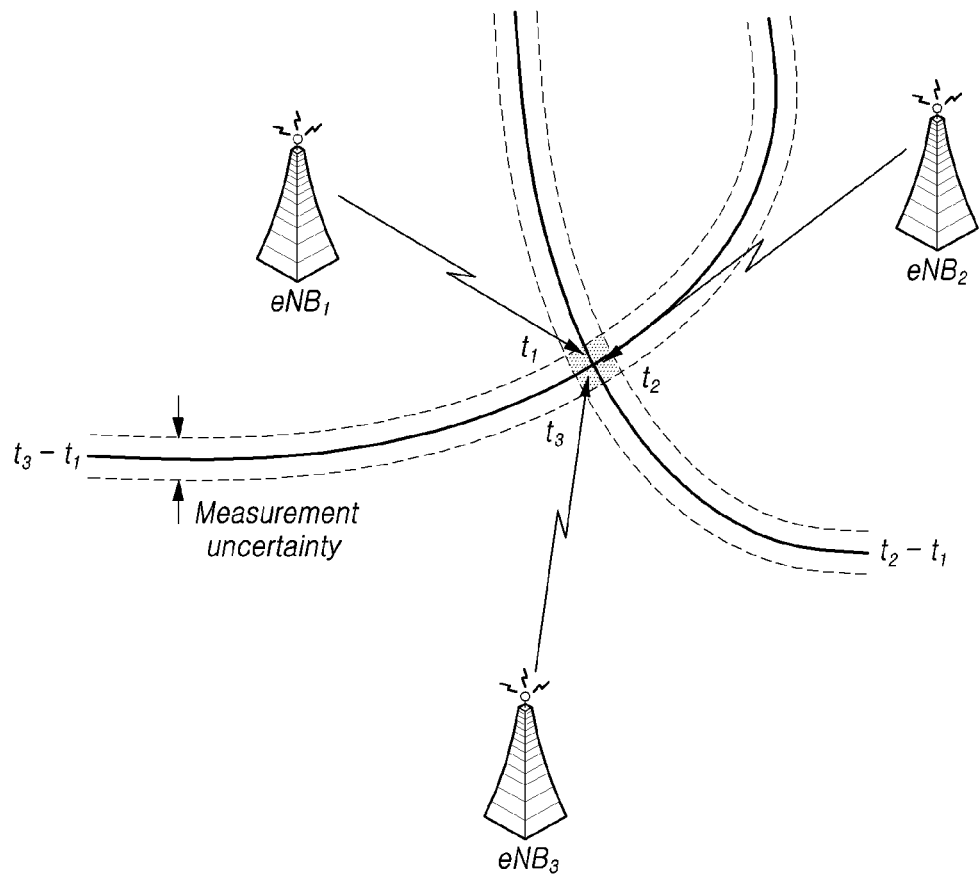
FIG. 13 is a view conceptually illustrating OTDOA-based positioning.

Observed Time Difference Of Arrival (OTDOA) is a representative technique of estimating a received signal time difference (RSTD), which is a difference in time between received signals as a basic principle for position measurement. Its basic principle is such that a position of a UE may be estimated by estimating an overlapping area based on time differences from at least 3 cells as shown in FIG. 13. For the PRS, PRS transmission information for a maximum of 24×3 (3-sectors) cells may be configured for a UE through higher-layer signaling.

Further, the UE is required to report RSTD values estimated for each cell to a corresponding base station. Following Table 7 represents values used for reporting time difference values estimated by the UE.

Basically, intervals from −15391 Ts to 15391 Ts are defined as a reporting range. Up to −4096 Ts ≤ RSTD ≤ 4096 ≤ Ts have 1 Ts resolution, and the remaining intervals have 5 Ts resolution.

TABLE 7

RSTD report mapping

| Reported Value | Measured Quantity Value | Unit |
|---|---|---|
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD < 0 | $T_s$ |
| RSTD_6356 | 0 < RSTD ≤ 1 | $T_s$ |

TABLE 7-continued

RSTD report mapping

| Reported Value | Measured Quantity Value | Unit |
|---|---|---|
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

Additionally, reporting for high resolution is also included in the corresponding standard as in Table 7. These values may be transmitted along with previously estimated RSTD, and reporting using RSTD_delta_0, RSTD_delta_1 is available in −2260 Ts≤RSTD≤10451 Ts, while reporting using all values except for RSTD_delta_1 is available in the intervals of 0000 Ts≤RSTD≤2259 Ts and 10452 Ts≤RSTD≤12711 Ts. Here, 1 Ts is about 9.8m. The following is a method of calculating based on 15 kHz that is the subcarrier-spacing of the LTE.

SCS=15 kHz, a reference OFDM symbol length=66.7 us 2048 samples are generated on the time axis based on 2048 FFT (oversampling not applied)

a length per sample on the time axis (=1 $T_s$)=66.7 us/2048 samples in time*(3*108 m/s)=9.8m

TABLE 8

Relative quantity mapping for higher-resolution RSTD measurement reporting

| Reported Relative Qkuantity Value | Measured Relative Quantity Value, $\Delta_{RSTD}$ | Unit |
|---|---|---|
| RSTD_delta_0 | 0 | $T_s$ |
| RSTD_delta_1 | 0.5 | $T_s$ |
| RSTD_delta_2 | 1.0 | $T_s$ |
| RSTD_delta_3 | 2.0 | $T_s$ |
| RSTD_delta_4 | 3.0 | $T_s$ |
| RSTD_delta_5 | 4.0 | $T_s$ |

A design scheme for the UL PRS in the NR has not been introduced until now. Accordingly, embodiments of the present disclosure introduce a method of configuring the UL PRS for the 5G NR.

Hereinafter, a method of transmitting a UL PRS based on semi-persistent scheduling for performing positioning in the NR, discussions according to embodiments will be described with reference to accompanying drawings.

Figure 14:
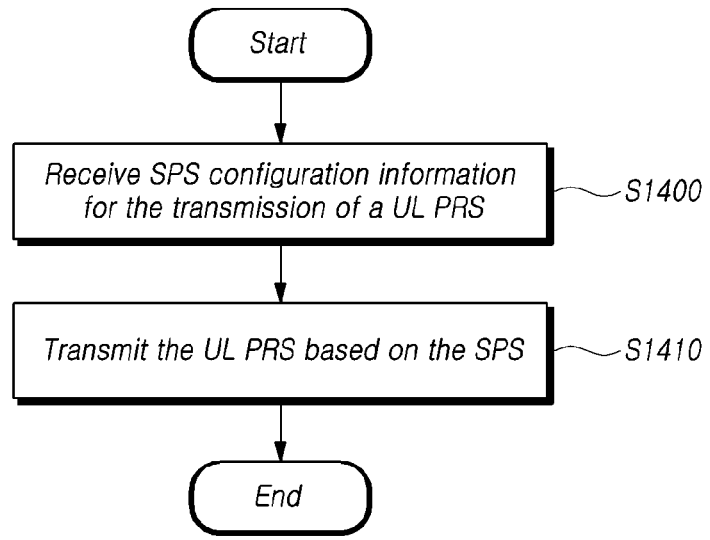
FIG. 14 is a flow diagram illustrating a procedure of a UE for positioning according to at least one embodiment of the present disclosure.

FIG. 14 is a flow diagram illustrating a procedure of a UE for performing positioning according to at least one embodiment of the present disclosure;

Referring to FIG. 14, a UE may receive semi-persistent scheduling (SPS) configuration information for transmission of an uplink positioning reference signal (UL PRS) from a base station, at step S1400.

Unlike DL positioning in which a PRS is transmitted from a base station to a UE for measuring the position of the UE, for UL positioning, each UE is required to transmit a UL PRS to a base station. The base station performs positioning by detecting UL PRSs received from a plurality of UEs.

In this case, in one embodiment, a configuration of a sounding reference signal (SRS) may be used for the UL PRS. In another embodiment, a configuration of a physical random access channel (PRACH) that is a UL channel, a demodulation reference signal (DMRS) or a phase tracking reference signal (PTRS), which is a reference signal, or the like may be used, or a new UL PRS may be configured, for the UL PRS.

Thus, since positioning is performed using UL PRSs transmitted from a plurality of UEs, to ensure higher positioning accuracy, only the UL PRS may be transmitted over a radio resource allocated for the transmission of a UL PRS, without transmitting any other data.

To do this, in one embodiment, a base station may configure a transmission area of the UL PRS through empty data scheduling. That is, the base station may configure a band with an SPS characteristic for a UE and may not actually perform PUSCH transmission over the corresponding area. In the corresponding PUSCH area, a reference signal, such as the SRS, or the like, may be allocated and then transmitted in the form of the UL PRS.

In one embodiment, the UE may receive SPS configuration information for transmission according to the semi-persistent scheduling of the UL PRS from the base station through higher layer signaling. The SPS configuration information may include information on a bandwidth part (BWP) index over which the UL PRS is transmitted, UL SPS resource allocation information including a transmission interval and a transmission periodicity of the UL PRS, information on a UL PRS pattern or a UL PRS transmission power value, or the like.

The UL PRS BWP index may be a BWP used to transmit the UL PRS among BWPs allocated to the UE. That is, distinguished from a BWP that is activated for enabling the UE to use for transmitting a PUCCH or a PUSCH for a separate purpose, the SPS configuration information may include BWP index information for indicating a BWP activated when transmitting the UL PRS.

The UL SPS resource allocation information is slot periodicity/configuration information and may include information on a transmission interval and a repetition periodicity of a SPS PUSCH. That is, the UL SPS resource allocation information may include information on a transmission interval and a transmission periodicity for transmitting the UL PRS based on the semi-persistent scheduling.

The UL PRS pattern may include information for indicating the SRS or the like used for the configuration of the UL PRS. In case only the SRS is used as the UL PRS, information for indicating the UL PRS pattern may not be included in the SPS configuration information. The UL PRS pattern may include i) a transmission pattern of the UL PRS for a symbol position or a comb size etc. used within a radio resource allocated for UL PRS transmission, which is pattern information of the UL PRS and ii) multiplexing/orthogonalization information according to a UE ID or a cell ID etc.

The UL PRS transmission power value may be indicated using power headroom report (PHR) information or defined using a new parameter configuration value. In the UL, since respective received powers from UEs are needed to be arranged for a base station, information on the UL PRS transmission power value may be included in the SPS configuration information.

Referring back to FIG. 14, the UE may transmit the UL PRS based on the SPS configuration information, at step S1410.

The UE may transmit the UL PRS to the base station based on information on a UL PRS BWP index, UL SPS resource allocation information, information on a UL PRS pattern or a UL PRS transmission power value, or the like, which is included in the received SPS configuration information. That is, the UE may perform SPS-based UL PRS transmission to the base station.

To do this, in one embodiment, the UE may receive configuration information on the UL PRS from the base station before transmitting the UL PRS. In one embodiment, a configuration of the SRS may be used for the UL PRS. In this case, it should be noted that a separate information element (IE) may be configured to be indicated through RRC signaling, or the like for the UL PRS. For example, even when the configuration of a typical SRS is used for the UL PRS, in case the SRS is used for positioning, a new IE may be configured separately from a typical IE for the SRS. That is, various parameters related to the transmission of the UL PRS may be defined in the separate new IE.

The configuration information on the UL PRS may include information on a symbol over which the transmission of the UL PRS is initiated in one or more UL slot(s) included in a radio resource for the transmission of the UL PRS. In one embodiment, the UL PRS may be configured to be transmitted in all symbols in the corresponding UL slot. That is, a starting point of the transmission of the UL PRS in the UL slot may be corresponded to one of all symbols in the corresponding slot.

Further, the configuration information on the UL PRS may include information on the number of symbols and a comb size for configuring the UL PRS in the UL slot allocated for transmitting the UL PRS. For example, it may be transmitted over symbol(s) corresponding to any one of 1, 2, 4, 8 or 12 in the UL slot configuring a radio resource allocated for transmitting the UL PRS. Alternatively, the UL PRS may be configured with a comb size of any one of 2, 4, or 8 for each symbol in the UL slot.

In one embodiment, the UE may receive, by DCI, triggering information of SPS-based UL PRS transmission other than the SPS configuration information. That is, when the triggering information of SPS-based UL PRS transmission is received by the DCI from the base station, the UE may perform subsequent UL PRS transmission based on the SPS. Likewise, the UE may receive release information of SPS-based UL PRS transmission by the DCI. That is, while the SPS-based UL PRS transmission is performed, when the corresponding release information is received from the base station, the UE may perform subsequent UL PRS transmission without being based on the SPS.

However, embodiments of the present disclosure are not limited thereto. SPS activation and release may be triggered by the UE according to a situation of the UE. For example, when overhead for UL PRS transmission is needed to be reduced, the UE may request SPS activation to the base station. Thereafter, when a channel state for UL PRS transmission gets better, the UE may request SPS release to the base station.

When the UE transmits the UL PRS to the base station, the base station may detect the UL PRS. A method of measuring a position of the UE using the detected UL PRS may be performed by a known method; therefore, embodiments of the present disclosure are not limited to a specific method.

As described above, by transmitting a UL PRS according to the SPS for measuring a position of a UE in accordance with at least one embodiment, it is possible to provide methods and apparatuses for performing positioning using the UL PRS.

Figure 15:
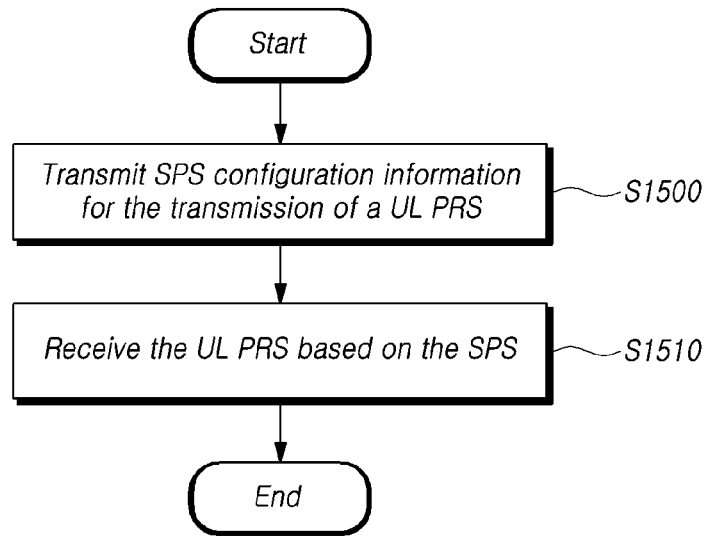
FIG. 15 is a flow diagram illustrating a procedure of a base station for positioning according to at least one embodiment of the present disclosure.

FIG. 15 is a flow diagram illustrating a procedure of a base station for performing positioning according to at least one embodiment of the present disclosure;

Referring to FIG. 15, the base station may transmit SPS configuration information for the transmission of a UL PRS to a UE, at step S1500.

For measuring a position of the UE, the base station performs positioning by detecting UL PRSs received from a plurality of UEs. In one embodiment, a configuration of the SRS may be used for the UL PRS.

Thus, since positioning is performed using UL PRSs transmitted from a plurality of UEs, to ensure higher positioning accuracy, only the UL PRS may be transmitted over a radio resource allocated for the transmission of a UL PRS, without transmitting any other data.

To do this, in one embodiment, a base station may configure a transmission area of the UL PRS through empty data scheduling. That is, the base station may configure a band with a SPS characteristic for a UE, and not actually perform PUSCH transmission over the corresponding area. In the corresponding PUSCH area, a reference signal, such as the SRS, or the like, may be allocated and then transmitted in the form of the UL PRS.

In one embodiment, the base station may transmit SPS configuration information for transmission according to the semi-persistent scheduling of the UL PRS to the UE through higher layer signaling. The SPS configuration information may include information on a bandwidth part (BWP) index over which the UL PRS is transmitted, UL SPS resource allocation information including a transmission interval and a transmission periodicity of the UL PRS, information on a UL PRS pattern or a UL PRS transmission power value, or the like.

Referring back to FIG. 15, the base station may receive the UL PRS based on the SPS configuration information, at step S1510.

The base station may receive the UL PRS from the UE based on information on a UL PRS BWP index, UL SPS resource allocation information, information on a UL PRS pattern or a UL PRS transmission power value, or the like, which is included in the SPS configuration information. That is, the base station may perform SPS-based UL PRS reception from the UE.

To do this, in one embodiment, the base station may transmit configuration information on the UL PRS to the UE before receiving the UL PRS. In one embodiment, a configuration of the SRS may be used for the UL PRS.

The configuration information on the UL PRS may include information on a symbol over which the transmission of the UL PRS is initiated in one or more UL slot(s) included in a radio resource for the transmission of the UL PRS. In one embodiment, the UL PRS may be configured to be transmitted in all symbols in the corresponding UL slot. That is, a starting point of the transmission of the UL PRS in the UL slot may be corresponded to one of all symbols in the corresponding slot.

Further, the configuration information on the UL PRS may include information on a number of symbols and a comb size for configuring the UL PRS in the UL slot allocated for transmitting the UL PRS.

In one embodiment, the base station may transmit, using DCI, triggering information of SPS-based UL PRS transmission other than the SPS configuration information. That is, when the triggering information of SPS-based UL PRS transmission is transmitted using the DCI to the UE, the base station may perform subsequent UL PRS reception based on the SPS. Likewise, the base station may transmit release information of SPS-based UL PRS transmission using the DCI. That is, while the SPS-based UL PRS reception is performed, when the corresponding release information is transmitted to the UE, the base station may perform subsequent UL PRS reception without being based on the SPS.

However, embodiments of the present disclosure are not limited thereto. SPS activation and release may be triggered by the UE according to a situation of the UE. For example, when overhead for UL PRS transmission is needed to be reduced, the base station may receive an SPS activation request from the UE. Thereafter, when a channel state for UL PRS transmission gets better, the base station may receive an SPS release request from the UE.

When the UE transmits the UL PRS to the base station, the base station may detect the UL PRS. A method of measuring a position of the UE using the detected UL PRS may be performed by a known method; therefore, embodiments of the present disclosure are not limited to a specific method.

As described above, by transmitting a UL PRS according to the SPS for measuring a position of a UE in accordance with at least one embodiment, it is possible to provide methods and apparatuses for performing positioning using the UL PRS.

Hereinafter, each of embodiments for transmitting a UL PRS based on semi-persistent scheduling (SPS) for positioning will be described in detail with reference to related drawings.

Use cases mainly proposed with respect to NR positioning are basically referring to "Positioning use case and accuracy" of TR 22.862. This is summarized in Table 9 below.

TABLE 9

SMARTER Use Cases and Potential Positioning Requirements

| Use case | Accuracy |
| --- | --- |
| Higher accuracy positioning outdoor with high speed moving | <1 m<br>Up to 200 km/h |
| Higher accuracy positioning with low speed moving (Including indoor and outdoor) | <1 m<br>Indoor and Outdoor |
| Higher accuracy positioning for low altitude UAV in critical condition (e.g. Drones) | Remote control(Outdoor): 0.5 m Horizontal0.3 m Vertical<br>Data analysis(Outdoor): 0.1 m Horizontal0.1 m Vertical |
| Higher accuracy positioning for mIoT | Wearables(Outdoor/Indoor): 2 m Horizontal<br>Patient location (in Hospital): 3 m Horizontal<br>Patient location (out Hospital): 200 m Horizontal |

According to NR requirements, it is required to provide higher resolution than the LTE and to support various use cases. In addition, some scenarios require three-dimensional positioning.

Accordingly, it is necessary to provide information on a vertical or horizontal direction in addition to typical OTDOA-based time difference. Further, it is necessary to provide single cell based position measurement information based on a signal strength value and beam information.

Hereinafter, UL PRS configuration methods will be described for UL positioning based on various use cases and candidate techniques related to the NR PRS described above.

Embodiment 1 a UE May Transmit a UL PRS Through Empty Data Scheduling

Unlike DL PRS, for UL positioning, a base station needs to transmit a PRS for each UE and detects PRSs from several UEs. In the LTE, UL PRS has not been designed separately, and treated as an implementation issue through typical UL signals. Herein, in one embodiment, an SRS may be used as a UL PRS for NR positioning. In another embodiment, a physical random access channel (PRACH) that is a UL channel, a demodulation reference signal (DMRS) or a phase tracking reference signal (PTRS), which is a reference signal, or the like, or an NR PRS newly designed may be used as a UL PRS for NR positioning.

Even when any channel or signal of such UL signals is selected and used as the UL PRS, for accuracy of positioning, it is necessary for only the UL PRS to be transmitted, without transmitting any other data. That is, in LTE PRS, when transmitting a PRS in DL, a base station does not perform PDSCH allocation in a PRS transmission interval. Thus, in a UL PRS transmission interval in UL, it is also necessary to have a characteristic of transmitting only the UL PRS.

Figure 19:
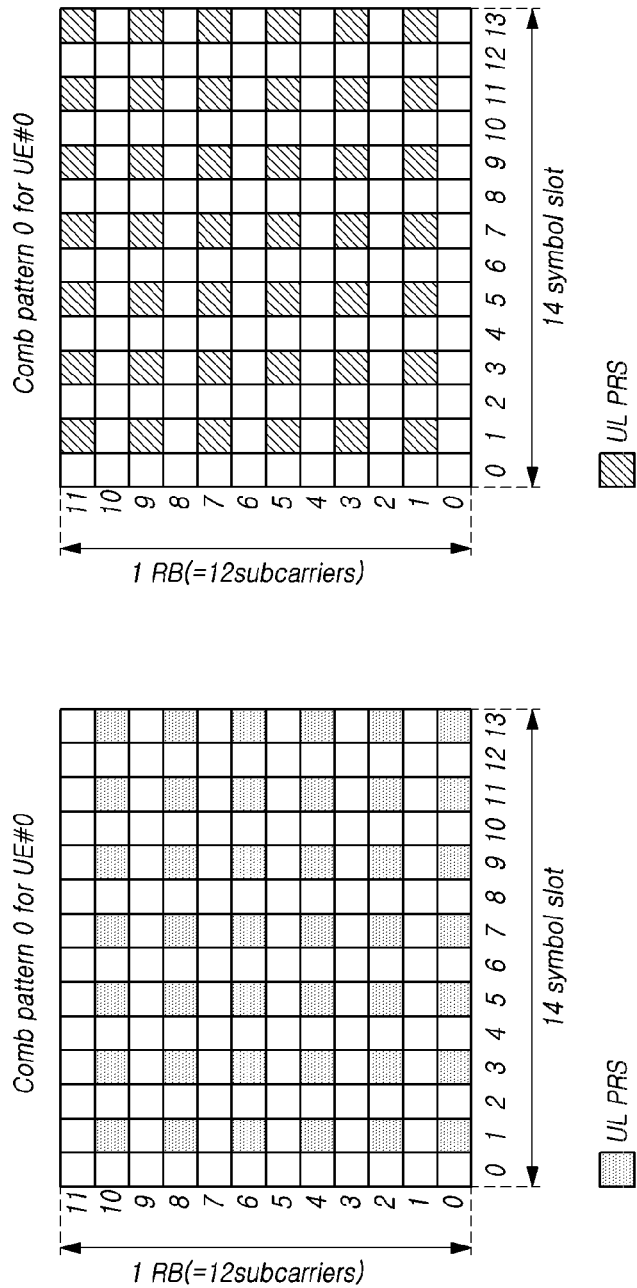
FIG. 19 is a view illustrating a UL PRS design employing a UL DMRS structure according to at least one embodiment of the present disclosure.

In one embodiments of the present disclosure, such a UL PRS transmission area may be obtained through empty data scheduling. That is, a base station may configure a band with a SPS characteristic for a UE, and not actually perform PUSCH transmission over the corresponding area. In the corresponding PUSCH area, a reference signal, such as the SRS, or the like, may be allocated and then transmitted in the form of the UL PRS. For example, as illustrated in FIG. 19, UL PRS transmission may be performed using a UL demodulation reference signal (DMRS). In this case, only a DMRS can be transmitted over an area for transmitting a UL PUSCH, and an actual data RE becomes empty.

Basically, a pre-configured higher layer configuration may be required to use an SPS-like resource as a UL PRS. In one embodiment, the higher layer configuration may include a UL PRS BWP index, UL SPS resource allocation information, a UL PRS pattern, a UL PRS transmission power value, or the like.

The UL PRS BWP index may be a BWP used to transmit a UL PRS among BWPs allocated to a UE.

The UL SPS resource allocation information is slot periodicity/configuration information. The UL SPS resource allocation information may include information on a transmission interval and a repetition periodicity of a SPS PUSCH. For example, the UL SPS resource allocation information may be configured with a total of 4 slots, which are slot #0~3, a repetition periodicity of 10 ms, an entire transmission interval of 1200 ms, or the like.

The UL PRS pattern is a UL RS type and may include information on a PRACH, an SRS, a DMRS, a PTRS, a new UL PRS, or the like. If one UL RS type among these is present, corresponding information may not be needed. The UL PRS pattern may include i) a predefined pattern of each RS, which is pattern information for actually allocating the UL PRS and ii) multiplexing/orthogonalization information according to a UE ID or a cell ID etc.

The UL PRS transmission power value may be indicated using power headroom report (PHR) information, or defined using a new parameter configuration value. In the UL, since respective received powers from UEs are needed to be arranged for a base station, a configuration for a UL PRS transmission power value is needed for the UL PRS as well. The UL PRS power value may be basically indicated to a PRS configuration value for each UE. This value may have a dB scale increase/decrease form relative to a specific value, or a reference power value may be indicated to this value.

Further, transmission may be initiated using DCI for SPS-formed PRS triggering.

Embodiment 1-1 an Empty Data Interval in which a UL PRS is Transmitted for Multiple UEs or Multiple UE Groups May be Multiplexed in TDM and/or FDM Area(s)

Figure 16:
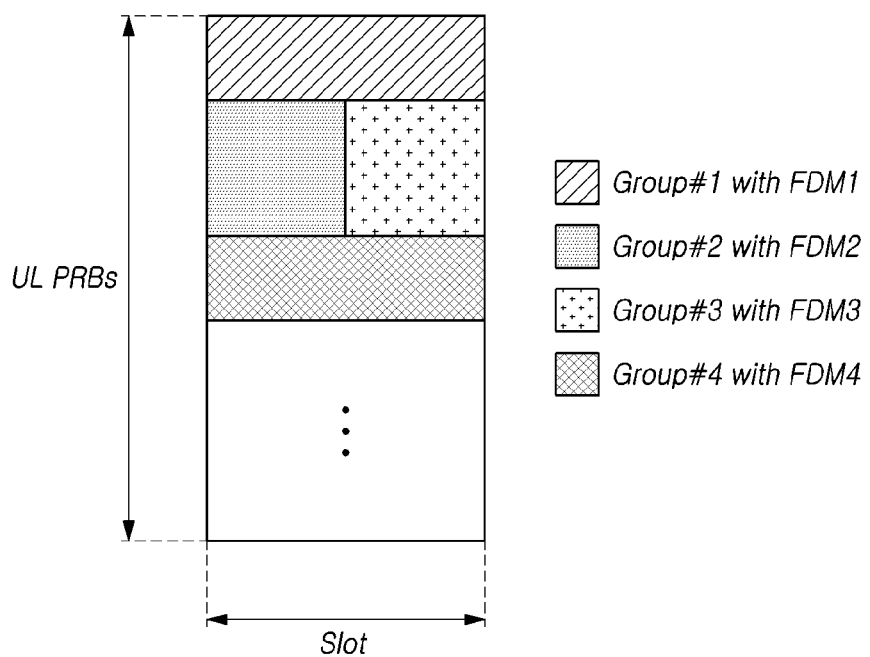
FIG. 16 is a view illustrating UL resource allocation for UL PRS transmission based on multiple UEs/groups according to at least one embodiment of the present disclosure.

As described above, for configuring empty data scheduling, multiplexing may be performed in a given resource area for each UE or UE group. At this time, respective resource allocations for corresponding UE groups or UEs are required to be orthogonal to one another. Accordingly, as illustrated in FIG. 16, when 4 UEs simultaneously transmit UL PRSs, an empty data transmission interval is separately allocated in each of a total of 4 TDM/FDM areas. When such a structure is defined in a single slot, it may be specifically indicated by an allocation area of a symbol or a physical resource block (PRB).

Embodiment 2 a UL PRS Configuration Area May be Allocated by being Divided into Specific Bandwidth Part(s) (BWP) or Bands According to Embodiment 2, a method is provided for configuring a UL PRS transmission resource (UL PRBs) band of the Embodiment 1. Since the BWP is defined in UE-specific manner, respective UL bandwidths actually allocated in a physical area for UEs may be different from one another. Herein, a method is proposed of separately defining a reference BWP (UL_PRS_BWP) for allowing a UE to transmit a UL PRS. Here, the UL_PRS_BWP may be defined such that all UEs are allocated to a BWP including equal bands, or a plurality of UL_PRS_BWPs may be defined depending on one or more UE group(s). In the defined UL_PRS_BWP, a UL PRS may be basically transmitted through orthogonal resource allocation or multiplexing between UEs.

In particular, if a new UL PRS is introduced, to ensure accuracy of position measurement in a base station, it is necessary for another UE to transmit only a PRS without performing PUSCH data transmission at a time for transmitting a corresponding PRS. Accordingly, needed is a process of defining the UL_PRS_BWP. The UL_PRS_BWP may be basically referred to as a reference BWP for transmitting a UL PRS, and UEs transmitting PRSs in a corresponding area do not basically perform PUSCH transmission. Further, when a UL grant is basically scheduled before some slots, such as n−4 time, and a corresponding PUSCH is transmitted over the same slot, there is a possibility of overlapping with a UL PRS. In this case, the UL PRS may have priority of transmission; thus, the overlapped PUSCH may be dropped. Alternatively, on the contrary, the PUSCH may have priority of transmission; however, setting of the priority for such a situation is also needed.

For the UL, since it is needed to consider transmission power of a UE, it is desirable to configure flexibly rather than always considering configurations for all BWPs. Further, if possible, since it is desirable not to perform PUSCH data transmission in corresponding areas in all UL cells, it is needed to arrange this.

Figure 17:
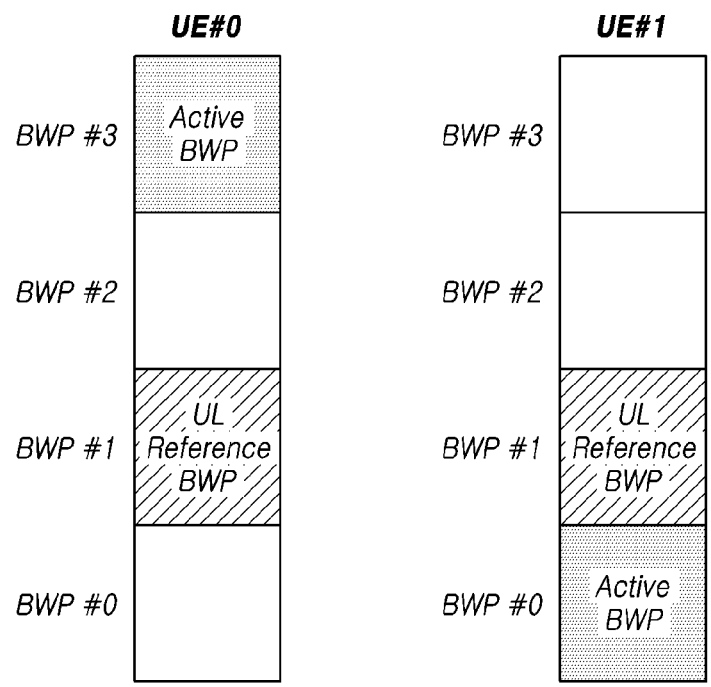
FIG. 17 is a view illustrating a UL reference BWP used when a UL PRS is transmitted according to at least one embodiment of the present disclosure.

Accordingly, in the present disclosure, when a BWP is configured in each cell or between cells, a method is provided for enabling a base station to receive PRSs of all UEs through an equal BWP, if possible, by defining a specific BWP as "UL PRS reference BWP" or "PRS transmission BWP" when transmitting a UL PRS. Here, it is basically desirable that reference BWPs over which PRSs are transmitted have an equal size to one another; however, the reference BWPs may be configured differently. As illustrated in FIG. 17, in UL BWPs, when bands actually used through activation are different, UL PRS transmission may be performed by changing all BWPs to an equal reference BWP.

In this case, a method of configuring higher layer signaling in the NR is needed based on typical LTE PRS configuration information. In particular, since UL signaling has not been defined under current standards, a typical DL PRS configuration method may be similarly employed. In this case, it is needed to include BWP information for PRS transmission in this. FIG. 18 illustrates an example of a UL PRS information element (IE) for supplying information related to a configuration of a PRS in one cell. In this example, the term "ulprs-BWPIndex" is used; however, it is possible to apply other information field forms.

That is, in one embodiment, a separate different information field may be defined for the UL PRS IE, and then, indicated through RRC signaling. For example, even when the configuration of a typical SRS is used for the UL PRS, in case the SRS is used for positioning, a new IE may be configured separately from a typical IE for the SRS. That is, various parameters related to the transmission of the UL PRS may be defined in the separate new IE.

Embodiment 3 a UL PRS Pattern May have a Characteristic of Reusing an SRS Structure or a DMRS Structure As described above, the UL PRS may be configured to use one or more typical signal(s) and/or channel(s), or a new UL PRS may be designed. Basically, it is advantageous for UL signaling to have a continuous structure on the frequency axis considering a peak to average power ratio (PAPR) characteristic of a UE. Accordingly, it may be designed to have a characteristic similar to the UL PRS structure or the UL DMRS structure.

For example, when assuming the following configuration based on the UL DMRS structure, it is needed to define configuration information, such as an occupied symbol index, a comb pattern index, a time domain starting offset, a frequency domain stating offset, or the like.

The occupied symbol index may be configured as, for example, '#0,2,4,6,8,10,12' etc. The comb pattern index may be configured as, for example, 'UE #0=0, UE #1=1' (O: even odd RE index, 1: odd RE index). The time domain starting offset may be implicitly configured through a time domain starting offset value, a UE RNTI, an antenna port, a cell ID, or the like, for example, as '1', or be configured as a value directly configured via a higher layer. The frequency domain stating offset may be implicitly configured through a frequency domain starting offset value, a UE RNTI, an antenna port, a cell ID, or the like, for example, as '0', or be configured as a value directly configured via a higher layer.

Herein, the time domain starting offset and the frequency domain stating offset may be configure to be orthogonal to each cell in line with a cell ID. For example, when illustrating the UL PRS with UL PRS patterns of UE #0,1 based on configuration information, resulted configuration may be as shown in FIG. 19.

As described above, by transmitting a UL PRS according to the SPS for measuring a position of a UE, it is possible to provide methods and apparatuses for performing positioning using the UL PRS.

Hereinafter, structures of a UE and a base station capable of performing a part or all of the embodiments described with reference to FIGS. 1 to 19 will be discussed with reference to the drawings.

Figure 20:
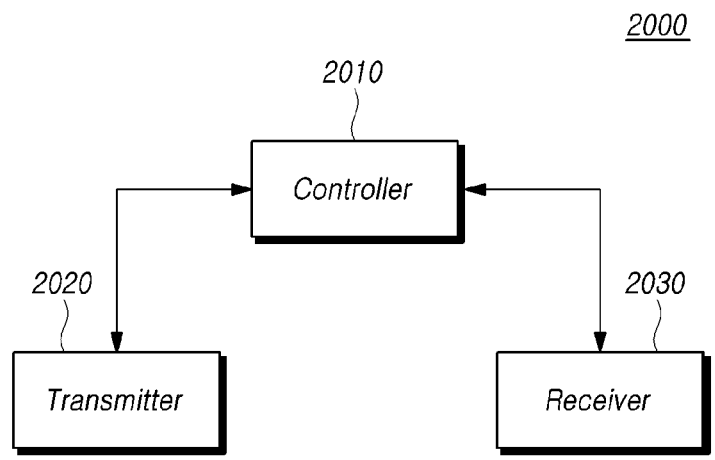
FIG. 20 is a block diagram illustrating a user equipment according to at least one embodiment of the present disclosure.

FIG. 20 is a block diagram illustrating a UE 2000 according to embodiments of the present disclosure.

Referring to FIG. 20, the UE 2000 includes a controller 2010, a transmitter 2020, and a receiver 2030.

The controller 2010 controls overall operations of the UE 2000 needed to perform methods for positioning according to the embodiments of the present disclosure described above. The transmitter 2020 transmits UL control information and data, messages through a corresponding channel to the base station. The receiver 2030 receives DL control information and data, message through a corresponding channel from a base station.

The receiver 2030 may receive SPS configuration information for the transmission of a UL PRS from the base station. In one embodiment, a configuration of the SRS may be used for the UL PRS.

Thus, since positioning is performed using UL PRSs transmitted from a plurality of UEs, to ensure higher positioning accuracy, only the UL PRS may be transmitted over a radio resource allocated for the transmission of a UL PRS, without transmitting any other data.

To do this, in one embodiment, a base station may configure a transmission area of the UL PRS through empty data scheduling. That is, the base station may configure a band with an SPS characteristic for a UE and may not actually perform PUSCH transmission over the corresponding area. In the corresponding PUSCH area, a reference signal, such as the SRS, or the like, may be allocated and then transmitted in the form of the UL PRS.

In one embodiment, the receiver 2030 may receive SPS configuration information for transmission according to the semi-persistent scheduling of the UL PRS from the base station through higher layer signaling. The SPS configuration information may include information on a bandwidth part (BWP) index for transmitting the UL PRS, UL SPS resource allocation information including a transmission interval and a transmission periodicity of the UL PRS, information on a UL PRS pattern or a UL PRS transmission power value, or the like.

The transmitter 2020 may transmit the UL PRS based on the SPS configuration information. The transmitter 2020 may transmit the UL PRS to the base station based on information on a UL PRS BWP index, UL SPS resource allocation information, information on a UL PRS pattern or a UL PRS transmission power value, or the like, which is included in the received SPS configuration information. That is, the transmitter 2020 may perform SPS-based UL PRS transmission to the base station.

To do this, in one embodiment, the receiver 2030 may receive configuration information on the UL PRS from the base station before transmitting the UL PRS. In one embodiment, a configuration of the SRS may be used for the UL PRS.

The configuration information on the UL PRS may include information on a symbol over which the transmission of the UL PRS is initiated in one or more UL slot(s) included in a radio resource for the transmission of the UL PRS. In one embodiment, the UL PRS may be configured to be transmitted in all symbols in the corresponding UL slot. That is, a starting point of the transmission of the UL PRS in the UL slot may be corresponded to one of all symbols in the corresponding slot.

Further, the configuration information on the UL PRS may include information on the number of symbols and a comb size for configuring the UL PRS in the UL slot allocated for transmitting the UL PRS.

In one embodiment, the receiver 2030 may receive, by DCI, triggering information of SPS-based UL PRS transmission other than the SPS configuration information. That is, when the triggering information of SPS-based UL PRS transmission is received by the DCI from the base station, the transmitter 2020 may transmit a subsequent UL PRS based on the SPS. Likewise, the receiver 2030 may receive release information of SPS-based UL PRS transmission by the DCI. That is, while the SPS-based UL PRS transmission is performed, when the corresponding release information is received from the base station, the transmitter 2020 may perform subsequent UL PRS transmission without being based on the SPS.

When the transmitter 2020 transmits the UL PRS to the base station, the base station may detect the UL PRS. A method of measuring a position of the UE using the detected UL PRS may be performed by a known method; therefore, embodiments of the present disclosure are not limited to a specific method.

As described above, by transmitting a UL PRS according to the SPS for measuring a position of a UE in accordance with at least one embodiment, it is possible to provide methods and apparatuses for performing positioning using the UL PRS.

Figure 21:
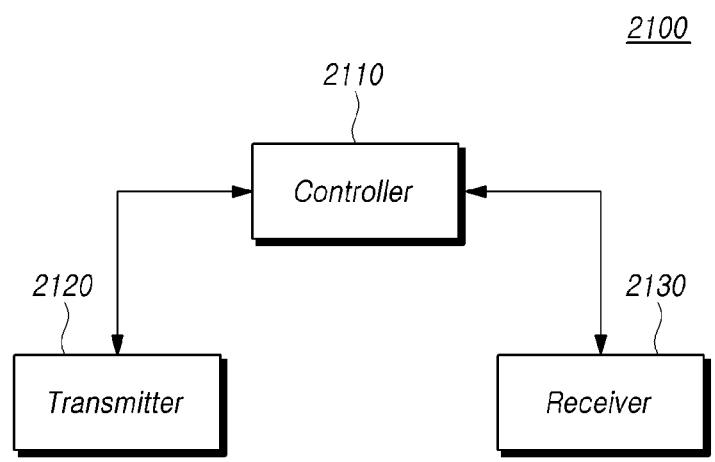
FIG. 21 is a block diagram illustrating a base station according to at least one embodiment of the present disclosure.

FIG. 21 is a block diagram illustrating a base station according to embodiments of the present disclosure.

Referring to FIG. 21, the base station 2100 includes a controller 2110, a transmitter 2120, and a receiver 2130.

The controller 2110 controls overall operations of the base station 2100 needed to perform methods for positioning according to the embodiments of the present disclosure described above. The transmitter 2120 is used to transmit signals, messages, and data needed for carrying out embodiments as described above to a UE. The receiver 2130 is used to receive signals, messages, and data needed for carrying out embodiments as described above from a UE.

The transmitter 2120 may transmit SPS configuration information for the transmission of a UL PRS to a UE. For measuring a position of the UE, the controller 2110 performs positioning by detecting UL PRSs received from a plurality of UEs. In one embodiment, a configuration of the SRS may be used for the UL PRS.

Thus, since positioning is performed using UL PRSs transmitted from a plurality of UEs, to ensure higher positioning accuracy, only the UL PRS may be transmitted over a radio resource allocated for the transmission of a UL PRS, without transmitting any other date.

To do this, in one embodiment, the controller 2110 may configure a transmission area of the UL PRS through empty data scheduling. That is, the controller 2110 may configure a band with a SPS characteristic for a UE, and not actually perform PUSCH transmission over the corresponding area. In the corresponding PUSCH area, a reference signal, such as the SRS, or the like, may be allocated and then transmitted in the form of the UL PRS.

In one embodiment, the transmitter 2120 may transmit SPS configuration information for transmission according to the semi-persistent scheduling of the UL PRS to the UE through higher layer signaling. The SPS configuration information may include information on a bandwidth part (BWP) index over which the UL PRS is transmitted, UL SPS resource allocation information including a transmission interval and a transmission periodicity of the UL PRS, information on a UL PRS pattern or a UL PRS transmission power value, or the like.

The receiver 2130 may receive the UL PRS based on the SPS configuration information. The receiver 2130 may receive the UL PRS from the UE based on information on a UL PRS BWP index, UL SPS resource allocation information, information on a UL PRS pattern or a UL PRS transmission power value, or the like, which is included in the SPS configuration information. That is, the receiver 2130 may perform SPS-based UL PRS reception from the UE.

To do this, in one embodiment, the transmitter 2120 may transmit configuration information on the UL PRS to the UE before receiving the UL PRS. In one embodiment, a configuration of the SRS may be used for the UL PRS.

The configuration information on the UL PRS may include information on a symbol over which the transmission of the UL PRS is initiated in one or more UL slot(s) included in a radio resource for the transmission of the UL PRS. In one embodiment, the UL PRS may be configured to be transmitted in all symbols in the corresponding UL slot. That is, a starting point of the transmission of the UL PRS in the UL slot may be corresponded to one of all symbols in the corresponding slot.

Further, the configuration information on the UL PRS may include information on the number of symbols and a comb size for configuring the UL PRS in the UL slot allocated for transmitting the UL PRS.

In one embodiment, the transmitter 2120 may transmit, using DCI, triggering information of SPS-based UL PRS transmission other than the SPS configuration information to the UE. That is, when the transmitter 2120 has transmitted the triggering information of SPS-based UL PRS transmission using the DCI to the UE, the receiver 2130 may receive a subsequent UL PRS based on the SPS. Likewise, the transmitter 2120 may transmit release information of SPS-based UL PRS transmission using the DCI. That is, while the SPS-based UL PRS reception is performed, when the corresponding release information is transmitted to the UE, the receiver 2130 may perform subsequent UL PRS reception without being based on the SPS.

When the UE transmits the UL PRS to the base station, the controller 2110 may detect the UL PRS. A method of measuring a position of the UE using the detected UL PRS may be performed by a known method; therefore, embodiments of the present disclosure are not limited to a specific method.

As described above, by transmitting a UL PRS according to the SPS for measuring a position of a UE in accordance with at least one embodiment, it is possible to provide methods and apparatuses for performing positioning using the UL PRS.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for performing positioning, the method comprising:
    receiving semi-persistent scheduling (SPS) configuration information for transmission of an uplink positioning reference signal (UL PRS) from a base station, wherein the SPS configuration information includes (i) information on a transmission interval and a transmission periodicity of the UL PRS, and (ii) a bandwidth part (BWP) index indicating a bandwidth part for transmitting the UL PRS among four bandwidth parts configured for the UE, and is received by higher layer signaling;
    receiving configuration information on the UL PRS from the base station, wherein the configuration information on the UL PRS includes information on a number of symbols and a comb size for configuring the UL PRS in an uplink slot allocated for the transmission of the UL PRS; and
    transmitting the UL PRS based on the SPS configuration information, wherein the UL PRS is configured to be transmitted in all symbols in an uplink slot included in a radio resource for the transmission of the UL PRS.

2. The method according to claim 1, further comprising: receiving the configuration information on the UL PRS from the base station before the UL PRS is transmitted.

3. A method of a base station for performing positioning, the method comprising:
    transmitting semi-persistent scheduling (SPS) configuration information for transmission of an uplink positioning reference signal (UL PRS) to a user equipment (UE), wherein the SPS configuration information includes (i) information on a transmission interval and a transmission periodicity of the UL PRS, and (ii) a bandwidth part (BWP) index indicating a bandwidth part for transmitting the UL PRS among four bandwidth parts configured for the UE, and is received by higher layer signaling;
    transmitting configuration information on the UL PRS to the UE, wherein the configuration information on the UL PRS includes information on a number of symbols and a comb size for configuring the UL PRS in an uplink slot allocated for the transmission of the UL PRS; and
    receiving the UL PRS based on the SPS configuration information, wherein the UL PRS is configured to be transmitted in all symbols in an uplink slot included in a radio resource for the transmission of the UL PRS.

4. The method according to claim 3, further comprising: transmitting the configuration information on the UL PRS to the UE before the UL PRS is received.

5. A user equipment (UE) for performing positioning, the UE comprising:
    a receiver configured to (a) receive semi-persistent scheduling (SPS) configuration information for transmission of an uplink positioning reference signal (UL PRS) from a base station, and (b) receive configuration information on the UL PRS from the base station, wherein the configuration information on the UL PRS includes information on a number of symbols and a comb size for configuring the UL PRS in an uplink slot allocated for the transmission of the UL PRS, wherein the SPS configuration information includes (i) information on a transmission interval and a transmission periodicity of the UL PRS, and (ii) a bandwidth part (BWP) index indicating a bandwidth part for transmitting the UL PRS among four bandwidth parts configured for the UE, and is received by higher layer signaling; and
    a transmitter configured to transmit the UL PRS based on the SPS configuration information, wherein the UL PRS is configured to be transmitted in all symbols in an uplink slot included in a radio resource for the transmission of the UL PRS.

6. The UE according to claim 5, wherein the receiver receives the configuration information on the UL PRS from the base station before the UL PRS is transmitted.

* * * * *